United States Patent Office

2,883,426
Patented Apr. 21, 1959

2,883,426

PROCESS FOR THE PREPARATION OF ALDEHYDES AND KETONES

Willem Brackman, Amsterdam, Netherlands, assignor to Shell Development Company, New York, N.Y., a corporation of Delaware No Drawing. Application October 4, 1957
Serial No. 688,146

Claims priority, application Netherlands October 5, 1956

4 Claims. (Cl. 260—596)

This invention relates to a process for the preparation of aldehydes from primary alcohols and ketones from secondary alcohols.

When subjected to oxidation by the process of this invention, primary alcohols are rapidly converted in high yield to the corresponding aldehydes and secondary alcohols are converted in high yield to the corresponding ketones, the conversion being effected at remarkably low temperatures which in many cases are not substantially different from ordinary room temperatures.

It is preferred that the alcoholic hydroxyl group or groups is or are the only non-hydrocarbon substituent group or groups present. Suitable aliphatic alcohols thus include, for example, the monohydric alcohols such as methyl alcohol, ethyl alcohol, n- and iso-propyl alcohols, the various straight-chain and branched-chain $C_4$ through $C_{20}$ alcohols, allyl alcohol and the like, benzyl alcohol, 2-phenylethyl alcohol, 1-phenylpropyl alcohol and the like and polyhydric alcohols such as 1,6-hexanediol. Also good results have been obtained starting from glycols one of the hydroxyl groups of which is etherified, such as the mono-methylether of ethylene glycol.

According to the invention, the aforesaid alcohols are oxidized by contacting the alcohol with a molecular oxygen containing gas in the presence of a complex formed from a copper salt and a primary and/or a secondary amine.

As the copper amine complex, there may be used any complex of either cuprous ion or cupric ion with any primary or secondary aliphatic amine, including those secondary amines wherein the nitrogen atom forms a part of a heterocyclic ring. Suitable copper amine complexes thus include the complexes of cuprous and/or cupric ion with dialkyl-amines such as dimethylamine, diethylamine, methyl ethyl amine, diisopropylamine, cyclohexylamine, dicyclohexylamine, and the like, and N-heterocyclic secondary amines, including those such as piperidine and pyrrolidine, wherein the nitrogen atom or atoms is (are) the only hetero ring atom(s), and including those such as morpholine wherein a nitrogen atom is but one of the hetero ring atoms. Secondary amines, particularly cyclic secondary amines are preferred.

The copper amine complexes are prepared by mixing a cupric compound with the amine. Such complexes may be prepared in an alcohol medium, and, if desired, can be prepared by mixing a cupric compound with the amine in the alcohol to be oxidized. Such in situ preparation of the copper amine complex to be used in the oxidation of the alcohol in many cases is preferable, inasmuch as such a technique avoids separate preparation of the complex. Suitable compounds for preparing the copper amine complexes are the cupric salts of inorganic and organic acids, for example cupric nitrate, cupric chloride, cupric perchlorate, copper acetate or the like.

The oxidation of the alcohol is conducted by mixing the alcohol and the copper amine complex and passing a molecular oxygen-containing gas into the resulting mixture until the oxidation is substantially complete. Although the oxidation may be conducted at any temperature at which the copper amine complex is stable, in general it will be found unnecessary and undesirable to employ reaction temperatures below about 0° C. or above about 100° C. In most cases, reaction temperatures not substantially different from ordinary room temperature, for example, temperatures of from about 15° C. to about 50° C., will be found suitable and most convenient. The reaction zone pressure is chosen to maintain the alcohol reactant in the liquid phase. Practical levels of conversion of the alcohol to the corresponding aldehyde or ketone are obtained in from a few minutes to several hours, depending primarily upon the intimacy of the contact maintained between the liquid reaction mixture and the molecular oxygen-containing gas, upon the partial pressure of oxygen in the reaction zone and upon the concentration of the copper amine complex in the reaction mixture. In general, the concentration of the complex is a major factor in determining the reaction rate. The amount of the complex used should be such as to provide at least 0.01 gram of copper per 100 grams of alcohol charged. Since in general, the reaction rate increases with the concentration of copper present, it is desirable to provide at least about 0.03 gram of copper per 100 grams of alcohol charged. Little additional advantage occurs from the provision of more than about 1 gram of copper per 100 grams of alcohol charged.

Contact between the molecular oxygen-containing gas, such as air, pure oxygen or enriched air, and the liquid mixture of copper amine complex and alcohol can be effected in various ways: a stream of the molecular oxygen-containing gas can be passed through the thoroughly stirred liquid mixture, or the liquid mixture can be sprayed into an atmosphere containing the oxygen-containing gas.

The aldehyde or ketone product is normally most easily recovered from the reaction mixture by distillation, if desired after decomposition of condensation products formed from aldehydes or ketones with amines, which decomposition may be effected readily by addition of an acid.

The following examples illustrate particular, non-limiting, applications of the process of the invention. (In these examples, parts by weight bear the same relationship to parts by volume as does the kilogram to the liter.)

Example I

A solution of 4.8 parts by weight of cupric nitrate trihydrate in 208 parts by weight of methyl alcohol was mixed with 40 parts by weight of morpholine. Oxygen was passed through the stirred mixture which was maintained at a temperature of 25° C. At the end of 12 minutes, 1540 parts by volume of oxygen had been taken up. 3.1 parts by weight of formaldehyde were formed, representing a yield of formaldehyde of 80% based on the amount of oxygen consumed.

When the methyl alcohol is replaced by an equivalent amount (299 parts by weight) of ethanol, the product is acetaldehyde. When the methyl alcohol is replaced by an equivalent amount (390 parts by weight) of isopropyl alcohol, the product is dimethyl ketone.

Example II 0.5 part by weight of cupric nitrate trihydrate were dissolved in 147 parts by weight of benzyl alcohol and this solution was mixed with 8.6 parts by weight of piperidine. The mixture was maintained at 25° C. and while constantly stirred was contacted with molecular oxygen. At the end of 250 minutes, 2400 parts by volume of oxygen had been consumed. The yield of benzaldehyde was 94%, based on the amount of oxygen consumed. Substitution of an equivalent amount (415 parts by weight) of dimethyl amine for the piperidine results in a like yield of benzaldehyde.

*Example III*

2.6 parts by weight of cupric chloride (40 parts by weight of morpholine and 340 grams of 1,6-hexanediol are mixed and the mixture is intimately contacted with oxygen, the temperature of the mixture being 30° C., for 3 hours. The product is adipaldehyde.

*Example IV*

2.3 parts by weight of cupric nitrate trihydrate, 10 parts by weight of morpholine and 147 parts by weight of benzyl alcohol were mixed and the mixture intimately contacted with oxygen, the temperature of the mixture being 25° C., for 215 minutes. 2080 parts by volume of oxygen were taken up. A 100% yield of benzaldehyde, based on the amount of oxygen consumed, was obtained.

I claim as my invention:

1. A process for the preparation of aldehydes and ketones, said process comprising contacting an alcohol having at least one hydrogen atom directly bonded to the carbon atom of the carbinol group with a molecular oxygen-containing gas at a temperature from about 0° C. to about 100° C. in the presence of a liquid mixture of a complex formed from a copper salt and an amine having at least one hydrogen atom directly bonded to the nitrogen.

2. A process for the preparation of aldehydes and ketones, said process comprising contacting an alcohol having at least one hydrogen atom directly bonded to the carbon atom of the carbinol group otherwise unsubstituted with a molecular oxygen-containing gas at a temperature from about 0° C. to about 100° C. in the presence of a liquid mixture of a complex formed from a copper salt and an amine having at least one hydrogen atom directly bonded to the nitrogen.

3. A process for the preparation of aldehydes and ketones, said process comprising contacting an alcohol having at least one hydrogen atom directly bonded to the carbon atom of the carbinol group with a molecular oxygen-containing gas at a temperature from about 0° C. to about 100° C. in the presence of a liquid mixture of a complex formed from a copper salt and morpholine.

4. A process for the preparation of aldehydes and ketones, said process comprising contacting an alcohol having at least one hydrogen atom directly bonded to the carbon atom of the carbinol group with a molecular oxygen-containing gas at a temperature from about 0° C. to about 100° C. in the presence of a liquid mixture of a complex formed from a copper salt and piperidine.

References Cited in the file of this patent

UNITED STATES PATENTS

| | | |
|---|---|---|
| 2,459,896 | Schwartz | Jan. 25, 1949 |
| 2,462,413 | Meath | Feb. 22, 1949 |